United States Patent Office 2,896,454
Patented July 28, 1959

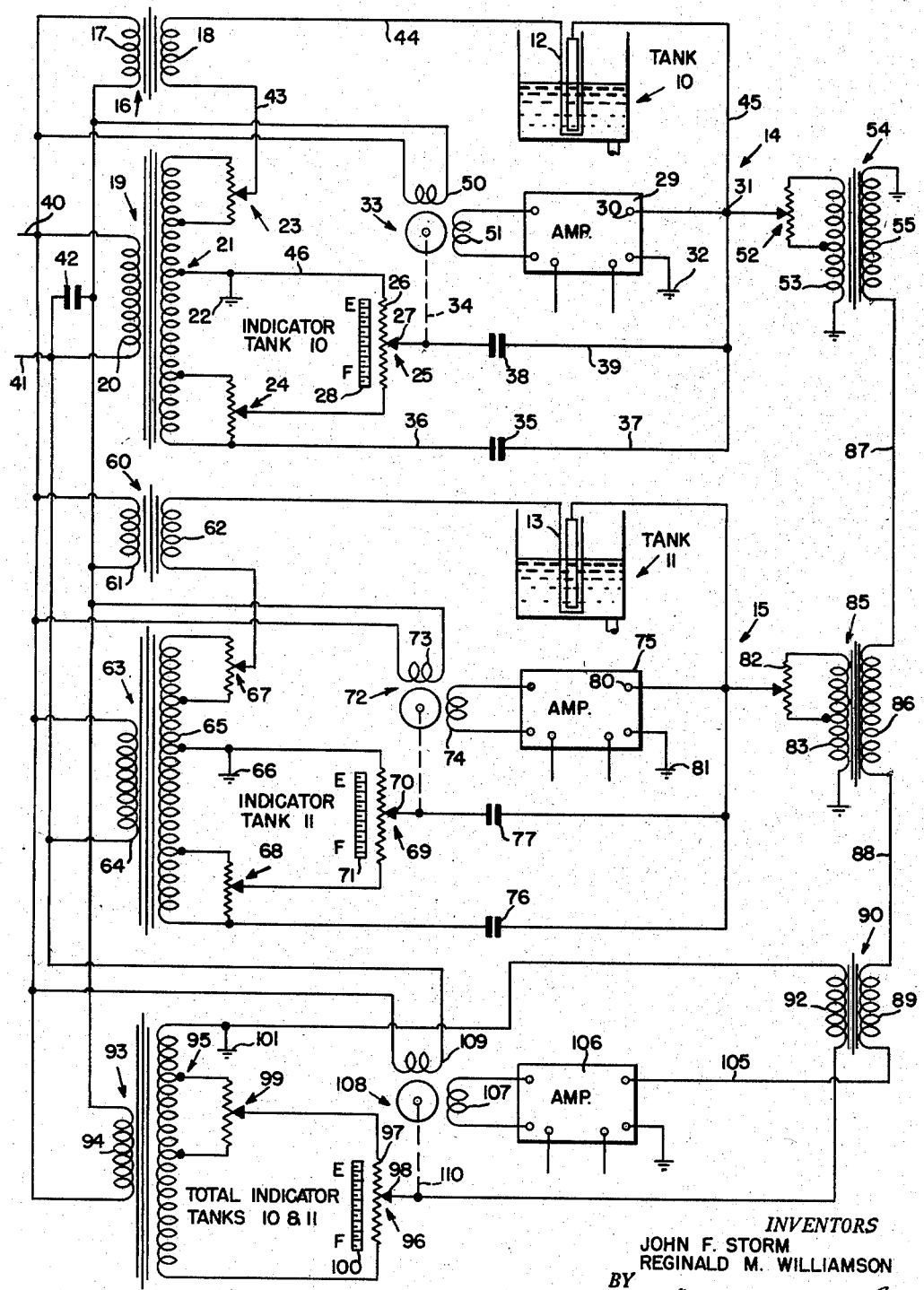

2,896,454

CONDITION SENSING APPARATUS

John F. Storm, Minneapolis, and Reginald M. Williamson, Brooklyn Park, Minn., assignors to Minneapolis-Honeywell Regulator Company, Minneapolis, Minn., a corporation of Delaware Application March 2, 1955, Serial No. 491,686

11 Claims. (Cl. 73—304)

The present invention is concerned with a condition sensing apparatus and more particularly with a fluid quantity apparatus for indicating the quantity of fuel in a plurality of individual containers and for indicating the total quantity of fuel in all of the containers.

The present invention is particularly adapted for use with aircraft and especially long-range, high-speed aircraft having a plurality of fuel tanks. In such an aircraft it is desirable to provide an indication of the quantity of fuel in each of the individual tanks so that the fuel flowing from the tanks can be scheduled to maintain the center of gravity of the aircraft within a desired range. It is also desirable to indicate the total quantity of fuel aboard the aircraft so that remaining flight time can be determined.

It is therefore an object of the present invention to provide control apparatus for indicating the quantity of fluid in a plurality of containers and utilizing signals of a first and a second characteristic, with a plurality of means for rebalancing the signals of a first characteristic to indicate the quantity of fluid in each of the individual containers, and with further means to sum the signals of the second characteristic and provide an indication of the total quantity of fluid in the containers.

It is a further object of the present invention to provide an improved control apparatus for indicating the quantity of liquid in a first and a second container and providing a first and a second liquid sensing means adapted to be positioned in the first and second container, means for applying to the individual sensing means a voltage of a first and second phase, means for rebalancing the signal of the first phase to indicate the quantity of fluid in each of the individual containers, and further means to sum the signals of the second phase derived from the sensing means and rebalancing this signal of the second phase to indicate the total quantity of fuel in the containers.

These and other objects of the present invention will be apparent to those skilled in the art upon reference to the following specification, claims, and drawing of which the single figure is a schematic representation of the present invention.

The reference numerals 10 and 11 designate first and second liquid containers, which may be the fuel tanks of an aircraft. Disposed within each of the tanks 10 and 11 are capacitance type liquid quantity sensing means 12 and 13. The sensing means 12 and 13 may be of the type shown in the Earl C. Bowar Patent 2,560,-757 and are generally of the type which have a minimum capacity value when the tanks are empty and have an increasing capacity value depending upon the quantity of fluid in the tanks.

The reference numerals 29, 75 and 106 designate three amplifiers of the conventional linear type. That is, amplifiers of the type which amplify an alternating current signal and provide an output which is an amplified reproduction of the signal applied to the input of the amplifier.

Associated with the tank 10 is a first bridge type network 14. Associated with the tank 11 is a second bridge type network 15.

Referring first to the bridge type network 14, this network consists of a transformer 16 having a primary winding 17 and a secondary winding 18. A further transformer is designated by the reference numeral 19 and has a primary winding 20 and a secondary winding 21 which is tapped and grounded at ground terminal 22. A calibration potentiometer 23 is connected across an upper portion of the secondary 21 and a further calibration potentiometer 24 is connected across a lower portion of the secondary 21. An indicating potentiometer 25 is provided having a resistance element 26 and a movable tap 27. Movable tap 27 cooperates with an indicator scale 28 to indicate the quantity of fuel in the tank 10.

An amplifier 29 is provided having an input with a first terminal 30 connected to a terminal 31 and a second terminal connected to ground connection 32. The output of amplifier 29 controls a two-phase reversible motor 33 which is mechanically connected by means of the broken line connection 34 to control the position of potentiometer tap 27.

The reference numeral 35 designates a capacitor which may be called an empty tank reference capacitor. This capacitor is connected to a lower terminal of secondary 21 by means of a conductor 36 and is connected to the terminal 31 by means of a conductor 37. The function of capacitor 35 is to provide an electrical current to the input of amplifier 29 which is equal and opposite to that current flowing from sensing means 12 which is due to the voltage of the upper portion of secondary 21 and which flows when the tank 10 is empty.

A further capacitor 38 is provided and is connected from potentiometer tap 27 to conductor 39 and thereby to terminal 31. The function of capacitor 38 is to provide an electrical current to the input of amplifier 29 which rebalances that current flowing from sensing means 12 which is due to the upper portion of secondary 21 and which is indicative of the quantity of fuel in the tank 10.

Electrical power is supplied to the apparatus of the single figure of this invention from power line conductors 40 and 41. The primary 20 of transformer 19 is directly connected to the power line conductors 40 and 41 while the primary 17 of transformer 16 is directly connected to power line conductor 40 and is connected to power line conductor 41 through a phase shifting capacitor 42. The phase shifting capacitor 42 performs the function of shifting the phase of the line voltage 90 degrees. In other words, the voltage applied to the primary 17 is 90 degrees out of phase with respect to the voltage applied to the primary 20.

The operation of network 14 will now be described by tracing the current flow circuits which exist through the input of amplifier 29. A first circuit can be traced from ground connection 22 through the upper portion of secondary 21, calibration potentiometer 23, conductor 43, secondary 18, conductor 44, sensing means 12, conductor 45, terminal 31, input terminal 30 of amplifier 29 and ground terminal 32. In this circuit it can be seen that there are two voltage sources, namely the upper portion of secondary 21, and secondary 18. These voltages are 90 degress out of phase since the primaries of these transformers are supplied with voltages which are 90 degrees out of phase. These two voltages cause two currents to flow in the input of amplifier 29 which are 90 degrees out of phase and of a magnitude depending upon the quantity of fuel in the tank 10.

A second current flow circuit can be traced from ground connection 22 through conductor 46, the upper portion of resistance element 26, potentiometer tap 27, capacitor 38, conductor 39, terminal 31, input terminal 30 of amplifier 29, and ground connection 32. In this circuit it can be seen that there is a single voltage source, namely the lower portion of secondary 21 and that this voltage source is 180 degrees out of phase with respect to the voltage of the upper portion of secondary 21, ground connection 22 as a reference. The magnitude of the voltage in this circuit is controlled by the position of potentiometer tap 27, and by proper adjustment of this tap, as will be described, the current flowing through capacitor 38 is made equal to that component of current flowing through the sensing means 12 which is due to the voltage of the upper portion of secondary 21 and which is indicative of the quantity of fuel in the tank 10.

A third current flow circuit can be traced from ground connection 22 through the lower portion of secondary 21, conductor 36, capacitor 35, conductor 37, terminal 31, input terminal 30 of amplifier 29, and ground connection 32. In this circuit there is a single source of voltage, namely the lower portion of secondary 21. This voltage is 180 degrees out of phase with respect to the voltage applied to sensing means 12 from the upper portion of secondary 21. The function of capacitor 35 in this circuit is to supply an electrical current to the input of amplifier 29 which is equal and opposite in phase to that current flowing through the sensing means 12 which is due to the upper portion of secondary 21 when there is no fuel in the tank 10.

All of the above traced currents flow through the input of amplifier 29. The sum of the currents flowing through capacitors 38 and 35 is equal and opposite to that component of current flowing through sensing means which is due to the voltage applied to sensing means 12 from the upper portion of secondary 21.

Amplifier 29 amplifies these currents and applies them to the control winding 51 of motor 33. The line voltage winding 50 of motor 33 is connected directly to the power line conductor 40 and through the phase shifting capacitor 42 to the power line conductor 41. The two-phase motor 33 is sensitive only to currents or voltages displaced 90 or 270 degrees from the current or voltage applied to the line voltage winding 50. This means that motor 33 is sensitive only to the current or voltage derived from the upper or lower portion of secondary 21.

Motor 33 is operative to control the position of potentiometer tap 27 to rebalance, in the input of amplifier 29, the currents which flow due to the secondary 21. When this condition has been achieved, the position of potentiometer tap 27 in cooperation with indicator scale 28 indicates the quantity of liquid in the tank 10.

The component of current which flows through the input of amplifier 29 due to secondary 18 has no controlling effect upon the motor 33 since this current does not bear the proper phase relationship to the current applied to line voltage winding 50. This component of current from secondary 18 is also applied to a calibration potentiometer 52 which is connected to the primary 53 of a transformer 54. Transformer 54 has a secondary 55 and a voltage is induced in secondary 55 which is of the same phase relationship as the voltage associated with transformer 16 and is of a magnitude indicative of the quantity of fuel in the tank 10.

The second network 15 is substantially identical to the network 14. Network 15 includes a transformer 60 having a primary 61 which is directly connected to power line conductor 40 and through phase shifting capacitor 42 to the power line conductor 41. Transformer 60 has a secondary 62 which has the upper terminal thereof connected to sensing means 13.

The reference numeral 63 designates a transformer having a primary winding 64 which is connected directly to the power line conductors 40 and 41. The secondary 65 of transformer 63 is tapped and connected to a ground connecttion 66. A calibration potentiometer 67 is provided and is connected across an upper portion of the secondary 65 while a second calibrating potentiometer 68 is provided and is connected across a lower portion of the secondary 65.

An indicating potentiometer 69 is provided having a movable tap 70 which cooperates with an indicator scale 71 to indicate the quantity of liquid in the container 11. The potentiometer tap 70 has its position controlled by a two-phase motor 72 having a line voltage winding 73 which is directly connected to power line conductor 40 and connected through phase shifting capacitor 42 to the power line conductor 41. The control winding 74 of two-phase motor 72 is controlled by the output of an amplifier 75. Amplifier 75 is identical to amplifier 29 and is a conventional linear amplifier which provides at the output thereof an amplified reproduction of the signal applied to the input terminals of the amplifier.

Network 15 includes an empty tank reference capacitor 76 which is connected to the input of amplifier 75 and to a lower terminal of secondary 65 and performs a function similar to the function of capacitor 35 of network 14.

Network 15 has a second capacitor 77 which is connected to the input of amplifier 75 and to the tap 70 of the potentiometer 69 in the same manner as the connection of capacitor 38 of network 14.

The operation of network 15 is substantially identical to the above described operation of network 14. In other words, the electrical current flowing to the input terminal 80 and ground connection 81 of amplifier 75 from capacitors 76 and 77 bears a 180-degree phase relationship to that component of current flowing through sensing means 13 which is due to the voltage of the upper portion of secondary 65. By proper adjustment of potentiometer tap 70 this current is made equal to that component of current flowing through the sensing means 13. When this condition exists, the position of potentiometer tap 70 in cooperation with indicating scale 71 indicates the quantity of fuel in the tank 11. The component of current flowing through sensing means 13 which is due to the voltage of secondary 62 does not control the operation of the motor 72 since it does not bear the proper phase relationship to the voltage applied to the line voltage winding 73. However, this current is also applied to a calibrating potentiometer 82 which is connected to the primary 83 of a transformer 85. The transformer 85 has a secondary 86 and the voltage induced in secondary 86 is of the same phase relationship as the voltage applied to the transformer 60.

From the above recited structure it can be seen that the voltage present on secondaries 55 and 86 are of the same phase relationship and by means of a conductor 87 the voltage present on secondaries 55 and 86 are added and applied to a conductor 88. Conductor 88 is connected to the secondary winding 89 of a transformer 90 having a primary winding 92.

Transformer 90 is generally associated with a further electrical network including a transformer 93 having a primary 94 which is directly connected to power line conductor 40 and is connected through the phase shifting capacitor 42 to the power line conductor 41. Transformer 93 has a secondary winding 95 and from the above described connections it can be seen that the voltage applied to the secondary 95 is of the same phase as the voltage applied to the secondaries 18 and 62 of the networks 14 and 15 respectively.

An indicating potentiometer 96 having a resistance element 97 and a movable tap 98 is provided and is connected to a lower terminal of secondary 95 and through a calibration potentiometer 99 to an intermediate point on secondary winding 95. Potentiometer tap 98 cooperates with an indicating scale 100 to indicate the total quantity of fuel in the tanks 10 and 11.

The upper terminal of secondary 95 is connected to ground connection 101 and is connected through the primary 92 of transformer 90 to the tap 98 of potentiometer 96. Due to the fact that the upper terminal of secondary 95 is grounded, the voltage applied to the potentiometer tap 98 is 180 degrees out of phase with the voltage on the upper terminals of secondaries 18 and 62 of networks 14 and 15 respectively.

It will be remembered that this voltage on the upper terminals of secondaries 18 and 62 is the voltage which causes a component of current to flow through the sensing means 12 and 13 respectively. This component of current is also applied to the primaries 53 and 83 of transformers 54 and 85 respectively.

If the voltage on the secondary 89 of transformer 90 is now considered, it can be seen that this voltage is 180 degrees out of phase with the voltage on the secondaries 86 and 55 of transformers 85 and 54 respectively and is of a magnitude dependent upon the setting of tap 98. Secondary 89 is connected to conductor 88 and to a conductor 105 in such a manner that the voltage on conductor 105 is a summation voltage of the voltages of secondaries 55 and 86 and the voltage of secondary 89.

Conductor 105 is connected to the input of an amplifier 106 and applies the above mentioned summation voltage to the input thereof. Amplifier 106 is identical to amplifiers 29 and 75 and is a conventional linear amplifier which produces as the output thereof an amplified reproduction of the signal applied to the input of the amplifier. The output of amplifier 106 is connected to control winding 107 of a two-phase motor 108. A line voltage winding 109 of motor 108 is connected directly to the power line conductors 40 and 41. Motor 108 is mechanically connected, by means of the broken line connection 110, to control the position of potentiometer tap 98.

The motor 108 is effective to cause potentiometer tap 98 to assume a position wherein the voltage applied to the secondary 89 of transformer 90 is exactly equal and opposite to the sum of the voltages applied to secondaries 55 and 86. When this condition exists the potentiometer tap 98 in cooperation with the indicating scale 100 indicates the total quantity of fuel in the containers 10 and 11.

If the quantity of fuel in either of the containers 10 and 11 should change, the motors 33 or 72 cause potentiometer taps 27 or 70 to be positioned to indicate the new quantity of fuel in the respective containers. Likewise, the voltage present on the secondaries 55 and 86 is changed and a signal is applied to the input of amplifier 106. Amplifier 106 then causes motor 108 to be positioned to move potentiometer tap 98 and cause the voltage applied to the secondary 89 to once again be equal and opposite to the sum of the voltages applied to secondaries 55 and 86. When this condition exists the potentiometer tap 98 in cooperation with indicating scale 100 indicates the new total quantity of fuel in the containers 10 and 11.

It can be seen from the above description that an improved control apparatus for indicating the individual quantity and the total quantity of liquid in a plurality of containers has been provided. Other modifications of the present invention will be apparent to those skilled in the art and it is intended that the scope of the present invention be limited solely by the appended claims.

We claim as our invention:

1. Apparatus for indicating the total quantity of liquid in a plurality of individual containers, comprising: a plurality of bridge circuits each having an impedance type liquid quantity sensing means in one leg thereof, a rebalance impedance in an adjacent leg thereof, a first and a second source of voltage of a first and second characteristic providing discrimination between said sources in the leg in series with said sensing means, a third source of variable voltage of the first discriminating characteristic in the leg in series with said rebalance impedance, and means responsive to the voltage of said first characteristic connected in the detecting leg of the bridge and effective to control said third source of voltage to rebalance the bridge with respect to the voltage of the first discriminating characteristic; means connected in the detecting leg of each of said bridge circuits and effective to add the voltages of said second discriminating characteristic for each of said bridge circuits, and voltage responsive means connected to said last named means and effective to indicate total quantity of liquid in the plurality of containers.

2. Sensing apparatus for use with a plurality of individual liquid containers for indicating the quantity of liquid in each container and for indicating the total liquid quantity, comprising: a plurality of electrical networks each of which includes an impedance type liquid sensing means associated with one of the containers, a first and a second source of voltage of a first and a second characteristic, said characteristic being of a sort capable of discriminating one source from the other, a third source of variable voltage of said first characteristic and having an output voltage of a sense opposite to the sense of said first source of voltage, means connecting said first and second sources of voltages to said sensing means to derive voltages of said first and second characteristic and of a magnitude indicative of the liquid quantity in the one container, further impedance means connected to said third source of voltage to derive a voltage of a sense opposite to the voltage of said first characteristic derived from said sensing means, voltage responsive means connected to said sensing means and to said further impedance means and arranged to be controlled by the voltages therefrom, indicator means, means including said indicator means for adjusting said third source of voltage to cause the output thereof to be equal and opposite to the voltage of said first characteristic derived from said sensing means and to cause said indicator means to indicate the quantity of liquid in the one container; and further voltage responsive means connected to the sensing means of each of said plurality of electrical networks and responsive to the sum of the voltages of said second characteristic derived from the sensing means to indicate the total quantity of liquid in the plurality of containers.

3. Apparatus for use with a plurality of liquid containers, comprising: a plurality of capacitance type liquid sensing means each of which is adapted to be associated with one of the containers, a plurality of capacitors, a first plurality of alternating current voltage sources of a first phase, a second plurality of alternating current voltage sources of variable magnitude and of a phase opposite to said first phase, a third plurality of alternating current voltage sources of a second phase; means connecting each of said sensing means to one of said first and third voltage sources to derive signal voltages of said first and second phase and of a magnitude indicative of the quantity of liquid in one of the containers, means connecting each of said capacitors to one of said second voltage sources to derive a signal voltage of said phase opposite to said first phase; a plurality of voltage responsive means each one of which is connected to one of said sensing means and one of said capacitors to be controlled by the signal voltages derived therefrom, means controlled by each of said voltage responsive means to control the magnitude of the said second voltage source associated with the said capacitor to which said voltage responsive means is connected; and further means responsive to a signal voltage of said second phase and connected to each of said plurality of said sensing means to derive a signal voltage indicative of the total quantity of liquid in the plurality of liquid containers.

4. Liquid quantity indicating apparatus for use with a first and a second liquid container, comprising: a first and a second capacitance type liquid sensing means adapted to be mounted in the first and second container respectively, a first source of alternating current voltage of a first phase, a second source of alternating current voltage of a second phase, a first and a second transformer each having a secondary winding and having a primary winding connected to said source of voltage of said first phase, a third and a fourth transformer each having a secondary winding and having a primary winding connected to said source of voltage of said second phase, means connecting one end of said secondary winding of said first transformer to one end of said secondary winding of said third transformer, means connecting one end of said secondary winding of said second transformer to one end of said secondary winding of said fourth transformer, means connecting the other end of said secondary winding of said first and second transformers to said first and second sensing means respectively, a first and a second capacitor, means connecting the other end of said secondary winding of said third and fourth transformers in a variable voltage connection to said first and second capacitors respectively, a first and a second amplifier having an input and an output, means connecting said first amplifier input to said first sensing means and said first capacitor and to an intermediate point on said third transformer secondary, means connecting said second amplifier input to said second sensing means and said second capacitor and to an intermediate point on said fourth transformer secondary, means controlled by said first and second amplifier outputs to control the voltage applied to said first and second capacitor respectively to cause a rebalance of the voltage of said second phase applied to the input of said first and second amplifiers, and means responsive to a voltage of said first phase connected to said first and second sensing means to derive a voltage indicative of the total quantity of liquid in the first and second containers.

5. Fluid quantity indicating apparatus for use with a first and a second fluid container, comprising: a first and a second network each of which comprises capacitance type fluid sensing means associated with one of the containers, a capacitor, a first transformer having a primary winding connected to a source of alternating current of a first phase and having a secondary winding, a second transformer having a primary winding connected to a source of alternating current of a second phase and having a secondary winding, means connecting one end of said first transformer secondary winding to one end of said second transformer secondary winding; a potentiometer having a movable tap and a resistance element, means connecting said resistance element from the other end of said second transformer secondary winding to an intermediate point on said second transformer secondary winding, means connecting said sensing means and said capacitor in series to said potentiometer tap and the other end terminal of said first transformer secondary winding, an amplifier having an output and an input, means connecting said input from an intermediate point of said second transformer secondary to the connection of said sensing means to said capacitor, and means controlled by said amplifier output to control the position of said potentiometer tap to thereby rebalance the current in said amplifier input which is of said second phase and to indicate the quantity of fluid in the said one container; and means responsive to a current of said first phase connected to the sensing means of each of said first and second networks and responding to the sum of the currents of said first phase to indicate the total quantity of fluid in the first and second container.

6. Fluid quantity indicating apparatus for use with a first and a second fluid container, comprising: a first and a second network each of which comprises capacitance type fluid sensing means associated with one of the containers, a first and a second capacitor, a first transformer having a primary winding connected to a source of alternating current of a first phase and having a secondary winding, a second transformer having a primary winding connected to a source of alternating current of a second phase and having a secondary winding, means connecting one end of said first transformer secondary winding to one end of said second secondary winding; a potentiometer having a movable tap and a resistance element which is connected from the other end of said second transformer secondary winding to an intermediate point on said second transformer secondary winding, means connecting said sensing means and said first capacitor in series to said potentiometer tap and the other end terminal of said first transformer secondary winding, means connecting said second capacitor from the connection of said first capacitor and said sensing means to said other end of said second transformer secondary, an amplifier having an output and an input which is connected from an intermediate point of said second transformer secondary to the connection of said sensing means and said first capacitor, and means controlled by said amplifier output to control the position of said potentiometer tap to thereby rebalance the current in said amplifier input which is of said second phase and to indicate the quantity of fluid in the said one container; and means responsive to a current of said first phase connected to the sensing means of each of said first and second networks and responding to the sum of the currents of said first phase to indicate the total quantity of fluid in the first and second container.

7. Fluid quantity indicating apparatus for use with a first and a second fluid container, comprising: a first and a second network each of which comprises a capacitance type fluid sensing means associated with one of the containers, a capacitor, a first transformer having a primary winding connected to a source of alternating current of a first phase and having a secondary winding, a second transformer having a primary winding connected to a source of alternating current of a second phase and having a secondary winding, means connecting one end of said first transformer secondary winding to one end of said second secondary winding; a potentiometer having a movable tap and a resistance element which is connected from the other end of said second transformer secondary winding to an intermediate point on said second transformer secondary winding, means connecting said sensing means and said capacitor in series to said potentiometer tap and the other end terminal of said first transformer secondary winding, an amplifier having an output and an input which is connected from an intermediate point of said second transformer secondary to the connection of said sensing means and said capacitor, and means controlled by said amplifier output to control the position of said potentiometer tap to thereby rebalance the current in said amplifier input which is of said second phase and to indicate the quantity of fluid in the one container; a further transformer having a primary connected to said source of alternating current of said first phase and having a secondary winding, means connecting one end of said secondary to an intermediate point on said second transformer secondary windings of each of said first and second networks, a further potentiometer having a movable tap and a resistance element which is connected from the other end of said further transformer secondary to an intermediate point thereof, a further amplifier having an output and having an input which is electrically connected to the sensing means of said first and second networks and to the tap of said further potentiometer, and means controlled by the output of said further amplifier to control the position of said further potentiometer tap to cause rebalance of the voltage of said first phase in the input of said further amplifier and to indicate the total quantity of fluid in the two containers.

8. Condition sensing apparatus for use with a plurality of fluid containers to indicate the quantity of fluid in each container and to indicate the total quantity of fluid, comprising: a plurality of fluid quantity sensing means, one of which is associated with each of the containers, each of said quantity sensing means being arranged to derive a quantity signal having a first and a second component with the magnitude of each component being indicative of the quantity of fluid in the particular container with which the sensing means is associated, said components being such that they may be independently usable, a plurality of rebalance means arranged to derive a signal of a sense opposite to the sense of said first component of said quantity signal and each of said rebalance means having fluid quantity indicating means, a plurality of signal responsive means, means connecting one of said quantity sensing means and one of said rebalance means to one of said signal responsive means to provide fluid quantity indication for the container with which said one sensing means is associated, and further signal responsive means including a further fluid quantity indicator connected to said plurality of sensing means and controlled by said second component of said quantity signal to provide an indication of total fluid quantity.

9. Fluid quantity sensing means for indicating the quantity of fluid in each one of a plurality of fluid containers and for indicating the total fluid quantity, comprising: a plurality of fluid quantity sensing means one of which is associated with each container and is arranged to derive a quantity signal having a first and a second alternating current component capable of separate utilization with the magnitudes of said first and second components being indicative of the quantity of fluid in the container with which said one sensing means is associated, a plurality of rebalance means each having a fluid quantity indicator and each being arranged to derive a rebalance signal of variable magnitude and of a sense opposite to the sense of said first component of said quantity signal, means connecting one of said rebalance means to one of said quantity sensing means so that when the magnitude of said rebalance signal equals said first component of said quantity signal said quantity indicator indicates the quantity of fluid in the container with which said one quantity sensing means is associated, and further means connected to each of said sensing means and responsive to said second component of said quantity signal to provide an indication of total fluid quantity.

10. Apparatus for indicating the total effect of a plurality of conditions to be measured, comprising: a plurality of bridge circuits each having an impedance type condition sensing means in one leg thereof, a rebalance impedance in an adjacent leg thereof, a first and a second source of voltage of a first and a second characteristic capable of being separated in the leg in series with said sensing means, a third source of variable voltage of the first characteristic in the leg in series with said rebalance impedance, means responsive to the voltage of said first characteristic connected in the detecting leg of the bridge and effective to control said third source of voltage to rebalance the bridge with respect to the voltage of the first characteristic; means connected in the detecting leg of each of said bridge circuits and effective to add the voltages of said second characteristic for each of said bridge circuits, and voltage responsive means connected to said last named means and effective to indicate the total effect of the plurality of conditions sensed.

11. Condition sensing apparatus for use with a plurality of condition sensors to indicate the effect of each individual condition to which each of the sensors is subjected and to indicate the total effect of all of the conditions, comprising: a plurality of condition sensing means, each of said sensing means being arranged to derive a signal having a first and a second component with the magnitude of each component being indicative of the condition sensed by the particular sensing means, said components being such as to be separately usable, a plurality of rebalance means arranged to derive a signal of a sense opposite to the sense of said first component and each of said rebalance means having condition indicating means, a plurality of signal responsive means, means connecting one of said condition sensing means and one of said rebalance means to one of said signal responsive means, and further signal responsive means including a further indicator connected to said plurality of sensing means and controlled by said second component to provide an indication of the total effect of the conditions.

References Cited in the file of this patent

UNITED STATES PATENTS

| | | |
|---|---|---|
| 2,563,280 | Schafer et al. | Aug. 7, 1951 |
| 2,638,000 | Sontheimer | May 12, 1953 |
| 2,718,146 | Bancroft | Sept. 20, 1955 |